(12) United States Patent
Saito et al.

(10) Patent No.: US 11,161,470 B2
(45) Date of Patent: Nov. 2, 2021

(54) OCCUPANT OBSERVATION DEVICE

(71) Applicant: HONDA MOTOR CO., LTD., Tokyo (JP)

(72) Inventors: Kota Saito, Wako (JP); Seungho Choi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/815,034

(22) Filed: Mar. 11, 2020

(65) Prior Publication Data

US 2020/0290543 A1 Sep. 17, 2020

(30) Foreign Application Priority Data

Mar. 14, 2019 (JP) .............................. JP2019-047661

(51) Int. Cl.
| | | |
|---|---|---|
| *A61B 1/00* | (2006.01) | |
| *B60R 21/015* | (2006.01) | |
| *B60W 40/08* | (2012.01) | |
| *G06K 9/00* | (2006.01) | |

(52) U.S. Cl.
CPC ....... *B60R 21/01552* (2014.10); *B60W 40/08* (2013.01); *G06K 9/00597* (2013.01); *G06K 9/00845* (2013.01); *B60W 2040/0818* (2013.01)

(58) Field of Classification Search
CPC ................................. A61B 1/00; B60W 10/00
See application file for complete search history.

(56) References Cited

U.S. PATENT DOCUMENTS

| | | | | |
|---|---|---|---|---|
| 2008/0226175 A1* | 9/2008 | Suzuki | ............... | G06K 9/00268 382/190 |
| 2012/0308079 A1* | 12/2012 | Akiyama | ........... | G06K 9/00845 382/103 |
| 2018/0012090 A1* | 1/2018 | Herbst | ................ | G06K 9/6212 |
| 2019/0092337 A1* | 3/2019 | Chua | .................... | B60W 30/14 |

FOREIGN PATENT DOCUMENTS

JP 5343631 11/2013

* cited by examiner

*Primary Examiner* — Shirley Lu
(74) *Attorney, Agent, or Firm* — Amin, Turocy & Watson, LLP (57) ABSTRACT

An occupant observation device includes an imager configured to capture an image of a head of an occupant of a vehicle; an eye detector configured to detect at least a part of eyes of the occupant in an image captured by the imager; a mouth detector configured to detect at least a part of the mouth of the occupant in the image captured by the imager; and a condition estimator configured to estimate a condition of the occupant on the basis of a detection result of the eye detector and a detection result of the mouth detector, in which the condition estimator changes a ratio of reflecting each of the detection result of the eye detector and the detection result of the mouth detector in an estimation of the condition of the occupant, on the basis of the detection result of the eye detector or a result of a process performed on the basis of the detection result of the eye detector.

8 Claims, 6 Drawing Sheets

OCCUPANT OBSERVATION DEVICE

CROSS-REFERENCE TO RELATED APPLICATION

Priority is claimed on Japanese Patent Application No. 2019-047661, filed Mar. 14, 2019, the content of which is incorporated herein by reference.

BACKGROUND

Field of the Invention

The present invention relates to an occupant observation device.

Description of Related Art

Research is being conducted on a mechanism which detects a condition of an occupant, including a driver of a vehicle, using a device. The condition of the occupant includes whether the occupant feels sleepy, a degree of concentration, an emotion, and the like. Important factors for detecting the condition of the occupant are conditions of the eyes. Therefore, devices that capture an image of an occupant with a camera, analyze the image, and observe the condition of the eyes have been put into practical use.

For example, Japanese Patent No. 5343631 discloses a driving support device which is equipped with an imager that captures an image of a driver's face; a detector that detects movement of a driver's mouth or hand and opening and closing of the eyes from a face image captured by the imager; a first feature detector that detects a yawn from a change in a shape of a vertical component of the mouth detected by the detector, detects a sigh or a deep breath from a change in the shape of a horizontal component of the mouth, detects a movement motion of a driver's neck or head from a change in shape of the mouth, and detects a motion of a hand that approaches or separates from the driver's face; a second feature detector that detects an eye closing rate from a closing time of the eyes; and a determining unit that determines an arousal condition of the driver, a struggle or conflict condition with drowsiness, an initial condition of dozing, and a dozing condition from temporal changes in the feature motions detected by the first feature detector and the second feature detector.

SUMMARY

However, in the related art, since a proportion by which the condition of the eyes and the movement of the mouth are reflected in estimation of a condition of the occupant is uniform, in some cases, an accuracy of the condition estimation may be reduced.

The present invention has been made in view of such circumstances, and an object thereof is to provide an occupant observation device capable of maintaining a high accuracy of condition estimation of an occupant.

The occupant observation device according to the present invention adopts the following configuration.

(1): An occupant observation device according to an aspect of the present invention is equipped with an imager configured to capture an image of a head of an occupant of a vehicle; an eye detector configured to detect at least a part of eyes of the occupant in an image captured by the imager; a mouth detector configured to detect at least a part of the mouth of the occupant in the image captured by the imager; and a condition estimator configured to estimate a condition of the occupant on the basis of a detection result of the eye detector and a result of the mouth detector, in which the condition estimator changes a proportion by which each of the detection result of the eye detector and the result of the mouth detector are reflected in an estimation of the condition of the occupant, on the basis of the detection result of the eye detector or a result of a process performed on the basis of the detection result of the eye detector.

(2): In the aspect of the aforementioned (1), the eye detector may detect at least a part of a contour of the eyes of the occupant, the occupant observation device may further include an eye opening rate deriving unit configured to derive an eye opening rate of the eyes of the occupant, on the basis of a positional relationship of a plurality of feature points in the contour detected by the eye detector, the condition estimator may estimate the condition of the occupant on the basis of the eye opening rate of the eyes of the occupants and the result of the mouth detector, and the result of the process performed on the basis of the detection result of the eye detector may be a degree of eye opening of the eyes of the occupant obtained by the process of the eye opening rate deriving unit.

(3): In the aforementioned aspect (2), when a condition in which the degree of eye opening of the eyes of the occupant is equal to or less than a predetermined degree continues for a predetermined time or more, the condition estimator may change the ratio of reflecting the detection result of the eye detector and the result of the mouth detector in an estimation of the condition of the occupant.

(4): In the aspect of aforementioned (1), when the ratio of reflecting the detection result of the eye detector and the result of the mouth detector in an estimation of the condition of the occupant is changed, the condition estimator may reduce the ratio of reflecting the result of the eye detector in an estimation of the condition of the occupant.

According to the aforementioned aspects (1) to (4), it is possible to maintain a high accuracy of estimation of a condition of the occupant.

According to the aforementioned aspect (3), the accuracy of the occupant condition estimation can be maintained high even for an occupant with small eyes.

DESCRIPTION OF EMBODIMENTS

Hereinafter, an embodiment of an occupant observation device of the present invention will be described with reference to the drawings. The occupant observation device is mounted on a vehicle. The vehicle is a four-wheeled vehicle, a two-wheeled vehicle, or the like. In the following description, it is assumed that the vehicle is a four-wheel vehicle. Although the vehicle is assumed to be a right-hand drive vehicle, when applied to a left-hand drive vehicle, a left-right relationship in the following description may be read in reverse.

Figure 1:
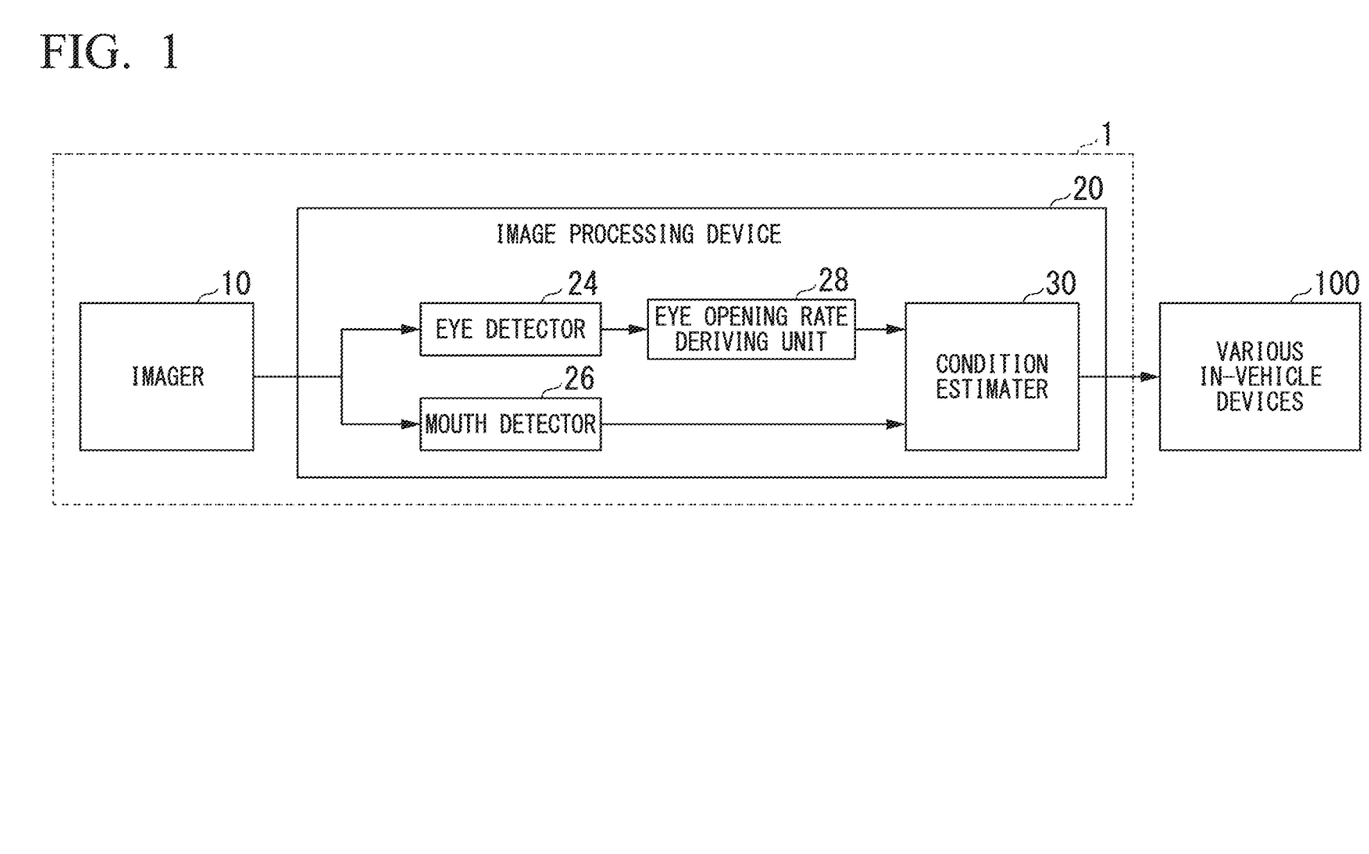
FIG. 1 is a diagram showing an example of a configuration and a use environment of an occupant observation device.

FIG. 1 is a diagram showing an example of a configuration and a use environment of the occupant observation device 1. The occupant observation device 1 is equipped with, for example, an imager 10 and an image processing device 20. The image processing device 20 is equipped with, for example, an eye detector 24, a mouth detector 26, an eye opening rate deriving unit 28, and a condition estimator 30. The occupant observation device 1 estimates, for example, the condition of the occupant of the vehicle, and outputs the estimation result to various in-vehicle devices 100. The occupant may include at least a driver, and may include an occupant of a passenger seat. The various in-vehicle devices 100 are a driving support device, an automatic driving control device, an agent device, and other devices, and the occupant observation device 1 estimates and outputs the condition of the occupant according to the types and purpose of the various in-vehicle devices 100. The condition of the occupant includes some or all of drowsiness, a direction of a visual line, an emotion, and the like. In the following description, it is assumed that the occupant observation device 1 estimates the drowsiness of the occupant.

Figure 2:
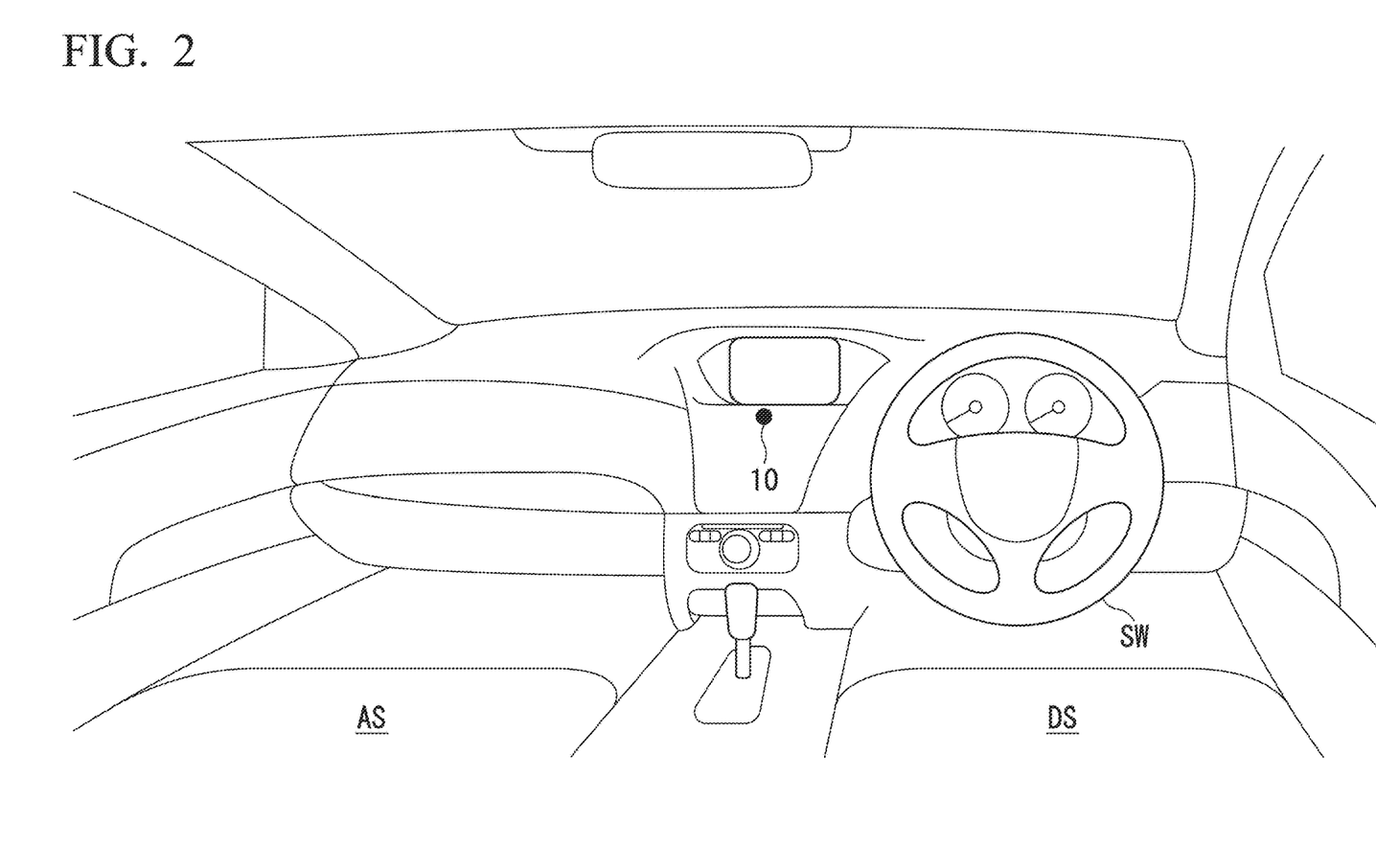
FIG. 2 is a diagram showing a position at which an imager is installed.

FIG. 2 is a diagram showing a position at which the imager 10 is installed. The imager 10 is installed, for example, in a central part of an instrument panel of the vehicle, and captures an image of at least the head of the occupant of the vehicle. In the drawing, SW is a steering wheel, DS is a driver's seat, and AS is a passenger seat.

The imager 10 includes, for example, one or both of an infrared camera that captures an image of infrared light and an RGB camera that captures an image of visible light as a color image. More preferably, the imager 10 includes at least an infrared camera, and may further include an RGB camera. In the following description, it is assumed that the imager 10 exclusively includes the infrared camera, and a case of including the RGB camera will be described later.

Returning to FIG. 1, each unit of the image processing device 20 will be described. The constituent elements of the image processing device 20 are realized, for example, by a hardware processor such as a central processing unit (CPU) that executes a program (software). Some or all of these constituent elements may be realized by hardware (a circuit unit; including circuitry) such as a large scale integration (LSI), an application specific integrated circuit (ASIC), a field-programmable gate array (FPGA), and a graphics processing unit (GPU), or may be realized by cooperation of software and hardware. The program may be stored in advance in a storage device such as a hard disk drive (HDD) or a flash memory (a storage device having a non-transitory storage medium) or may be stored in a removable storage medium such as a DVD or a CD-ROM (a non-transitory storage medium), and may be installed by attaching the storage medium to a drive device.

With respect to the function of the eye detector 24, a method of detecting eyes after extracting an edge will be described as an example. The eye detector 24 extracts, for example, the edge in an image captured by the imager 10 (hereinafter, referred to as a captured image). The edge is a pixel (or a pixel group) in which a difference in pixel value between the pixel and its surrounding pixels is larger than a reference, that is, a characteristic pixel. The eye detector 24 extracts the edge using, for example, an edge extraction filter such as a SOBEL filter. The use of the SOBEL filter is merely an example, and the eye detector 24 may extract the edge on the basis of another filter or an algorithm.

Figure 3:
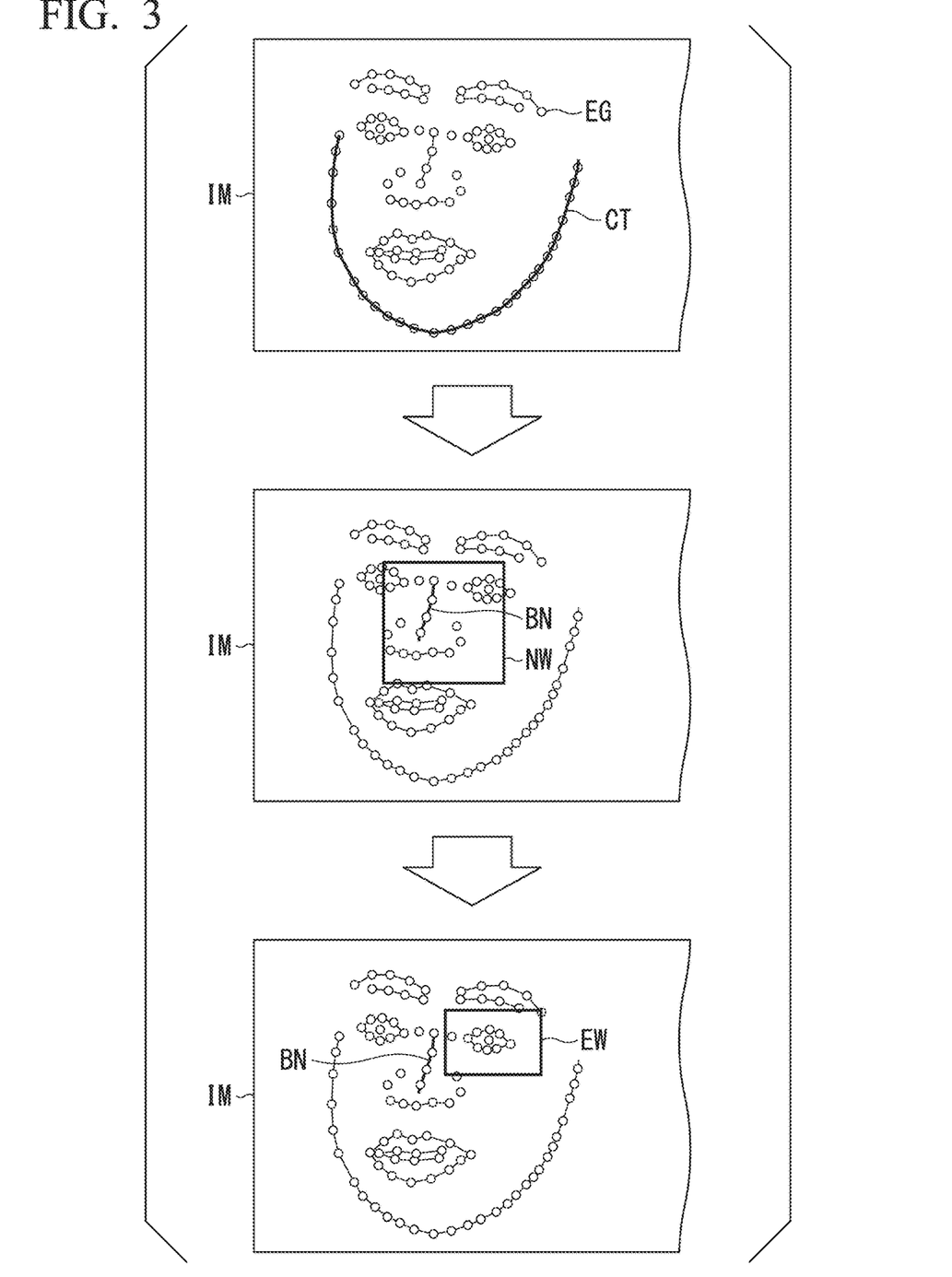
FIG. 3 is a diagram schematically showing the details of processes performed by an eye detector.

The eye detector 24 detects at least a part of the eyes of the occupant in the captured image, for example, on the basis of the distribution of edges extracted in the captured image. The eye detector 24 may directly detect a part of the eyes (or a feature point to be described later), by inputting a captured image to a learned model generated by a machine learning method such as deep learning, without extracting an edge. FIG. 3 is a diagram schematically showing the contents of the process performed by the eye detector 24. In the drawing, IM represents an image in which the edge EG is superimposed on the captured image. In this drawing, the occupant sitting in the driver's seat DS is exclusively focused on. The eye detector 24 first extracts a contour CT, by fitting a model such as an ellipse or an oval to an edge EG, as shown in the upper diagram of FIG. 3. Next, as shown in the middle diagram of FIG. 3, the eye detector 24 sets a nose detection window NM on the basis of the contour CT, and detects a position of a nose bridge BN which is a part in which the edge is easily and clearly extracted in the nose detection window NM. Next, as shown in a lower diagram of FIG. 3, the eye detector 24 sets eye detection windows EWr and EW1 of a predetermined size on the right and left sides of the nose bridge BN in which the left and right eyes of the occupant should exist, on the basis of the position of the nose bridge BN, and detects at least a part of the eyes in the eye detection window EW. As a result, the eye detection windows EWr and EW1 are set at positions overlapping the left and right eyes of the occupant sitting in the driver's seat DS. Hereinafter, when the eye detection windows EWr and EW1 are not distinguished, in some cases, they may be simply referred to as an eye detection window EW. Although specific examples of the process of "detecting at least a part of the eye" are variously defined, in the following description, it is assumed that "at least a part of the contour of the eyes is detected". When detecting the contour, the eye detector 24 detects the contour, for example, by fitting a curve model to the distribution of the edge EG.

The mouth detector 26 sets a mouth detection window MW (not shown) on the basis of the position of the nose bridge BN, for example, using a part of the processing procedure of the eye detector 24, and detects at least a part of the outline of the image of the mouth in the mouth detection window MW. The contour of the mouth means, for example, a lower end line of an upper lip and an upper end line of a lower lip. Instead of the aforementioned case, the mouth detector 26 may directly detect a part of the contour of the mouth, by inputting a captured image to a learned model generated by a machine learning method such as deep learning.

Figure 4:
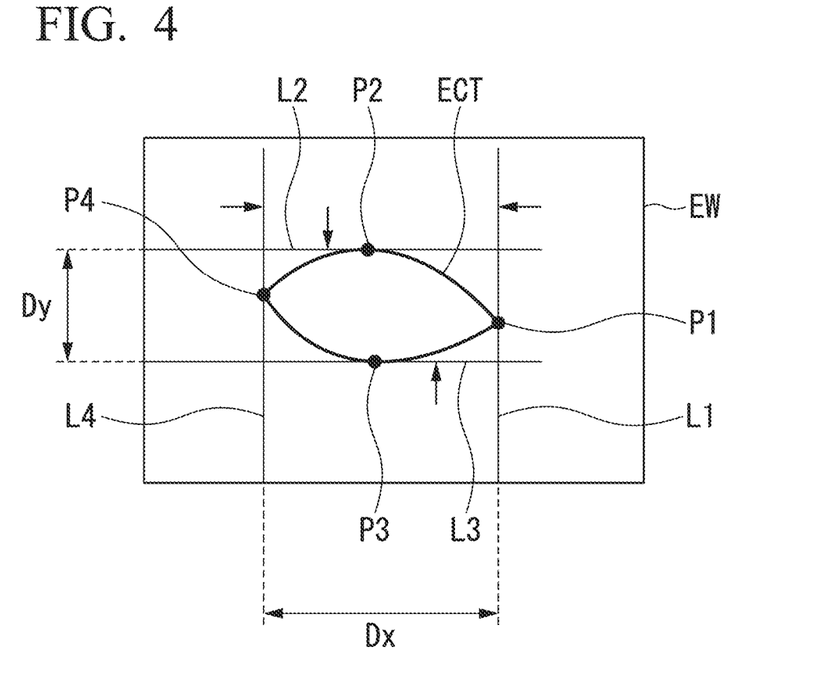
FIG. 4 is a diagram for explaining a process of an eye opening rate deriving unit.

The eye opening rate deriving unit 28 derives the eye opening rate of the eyes of the occupant, on the basis of a positional relationship of a plurality of feature points in the contour of the eye detected by the eye detector 24. The plurality of feature points include, for example, a first feature point at an end portion of the contour of the eye on the side closer to the imager 10 in a lateral direction (corresponding to one of an outer canthus or an inner canthus), a second feature point at the upper end portion, a third feature point at the lower end portion, and a fourth feature point at an end portion on the side away from the imager 10 in the horizontal direction (corresponding to the other of the outer canthus or the inner canthus). FIG. 4 is a diagram for explaining the process of the eye opening rate deriving unit 28. In the drawing, P1 is a first feature point, P2 is a second feature point, P3 is a third feature point, and P4 is a fourth feature point.

The eye opening rate deriving unit 28 virtually moves, for example, a vertical line L1 from the right end of the eye detection window EW to the left inside the eye detection window EW, and sets an intersection point at the time of first intersecting with the contour ECT of the eyes as the first feature point P1. The eye opening rate deriving unit 28 virtually moves, for example, a horizontal line L2 downward from the upper end of the eye detection window EW inside the eye detection window EW, and sets the intersection point at the time of first intersecting with the contour ECT of the eyes as the second feature point P2. The eye opening rate deriving unit 28, for example, virtually moves a horizontal line L3 upward from the lower end of the eye detection window EW inside the eye detection window EW, and sets the intersection point at the time of first intersecting with the contour ECT of the eyes as the third feature point P3. The eye opening rate deriving unit 28, for example, virtually moves the vertical line L4 from the left end of the eye detection window EW to the right in the eye detection window EW, and sets the intersection point at the time of first intersecting with the contour ECT of the eyes as the fourth feature point P4.

Further, the eye opening rate deriving unit 28 derives the degree Ro of eye opening of the occupant on the basis of the coordinates of the first to fourth feature points P1 to P4. For example, the eye opening rate deriving unit 28 may set a ratio of an interval Dx between the vertical lines L1 and L4 and an interval Dy between the horizontal lines L2 and L3 as a degree Ro of eye opening (see Formula (1)). The method of obtaining the degree Ro of eye opening is not limited thereto, and any method may be used.

$$Ro = Dx/Dy \quad (1)$$

Further, the eye opening rate deriving unit 28 derives the eye opening rate of the occupant on the basis of the degree Ro of eye opening. The eye opening rate deriving unit 28 defines, for example, a degree Roini of eye opening derived on the basis of a captured image from about a first few minutes after the occupant gets into the vehicle as an eye opening rate of 100 [%], and divides the degree Ro of eye opening derived thereafter by the reference degree Roini of eye opening to derive an eye opening rate α (see Formula (2)). The present invention is not limited thereto, and when person authentication of the occupant is performed, the reference degree of eye opening corresponding to 100% for each occupant may be stored in the memory, and the reference degree of eye opening for each occupant may be read from the memory and used for calculation. A specific value may be set for the reference degree Roini of eye opening, or a specific value may be used at first and may be gradually adjusted to the average degree of eye opening of the occupant.

$$\alpha = \text{MIN}\{Ro/Roini, 100\ [\%]\} \quad (2)$$

In the description so far, although the eye opening rate is derived on the basis of the degree Ro of eye opening on an image plane, for example, by preparing a three-dimensional model of the eye and performing the above-described process after mapping two-dimensionally from the eye model rotated depending on a face orientation angle estimated from the relationship between the contour CT and the nose bridge BN, the estimation accuracy of the eye opening rate can be improved.

The condition estimator 30 digitizes (or encodes to indicate the stage) the drowsiness of occupant, for example, on the basis of the eye opening rate α derived by the eye opening rate deriving unit 28 and the movement of the contour of the mouth detected by the mouth detector 26, and outputs the drowsiness of occupant to various in-vehicle devices 100. For example, the condition estimator 30 outputs a numerical value indicating that the drowsiness of occupant increases as the eye opening rate α decreases, and outputs a numerical value indicating that the drowsiness of occupant increases as the number of times a "yawn" is inferred from the movement of the mouth contour increases. The condition estimator 30 digitizes the drowsiness of the occupant, for example, by calculating a weighted sum of a reciprocal of the eye opening rate α and the number of yawns in an observation period (see Formula (3)). In Formula (3), γ is an index value indicating the drowsiness of the occupant, Cy is the number of yawns during the observation period, and βe and βm are coefficients indicating a ratio of reflecting each of the detection result of the eye detector 24 and the result of the mouth detector 26 in the estimation of the occupant's condition. The coefficients βe and βm are set in advance so that the sum becomes, for example, 1. For the method of detecting a yawn, for example, since the mouth greatly changes in the vertical direction when yawning, a method may be used in which a vertical length of the contour of the mouth detected by the mouth detector 26 is compared with a threshold value, and when a condition in which the vertical length is equal to or larger than the threshold value continues for a predetermined time or more, it is determined that a yawn has occurred.

$$\gamma = \beta e \cdot (1/\alpha) + \beta m \cdot Cy \quad (3)$$

Here, the condition estimator 30 changes the ratio between the coefficient βe and the coefficient βm, on the basis of the detection result of the eye detector 24 or the result of a process (for example, the degree Ro of eye opening) performed on the basis of the detection result of the eye detector 24. Specifically, when a predetermined event occurs, the condition estimator 30 may change the coefficient βe and the coefficient βm so that the coefficient βe decreases and the coefficient βm increases.

The following is a list of predetermined events in which the condition estimator 30 becomes a trigger which changes the ratio between the coefficient βe and the coefficient βm.

(1) The fitting rate of the edge EG to the contour of the eye is lower than a reference.

(2) The variation of the distribution of the edge EG to the fitting curve is larger than a reference.

(3) The pupil cannot be distinguished or the white of the eye and the iris cannot be distinguished.

(4) The condition in which the degree Ro of eye opening is equal to or less than the predetermined degree has continued for a predetermined time or more.

Figure 5:
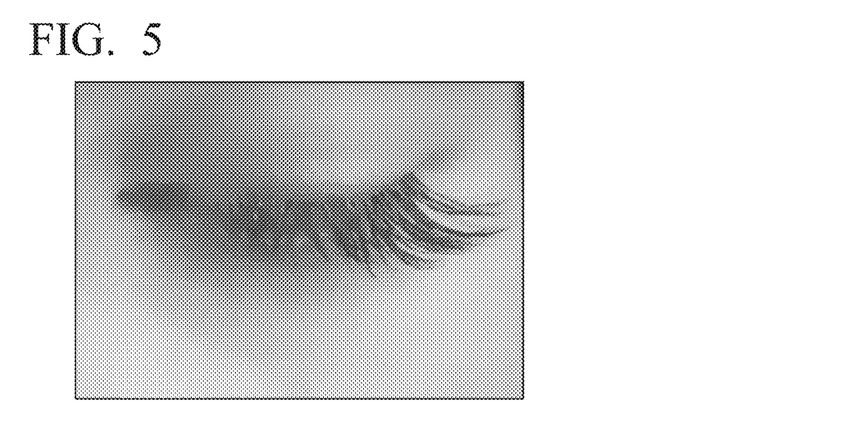
FIG. 5 is a diagram showing a part of a person in which a predetermined event is likely to occur.
Figure 6:
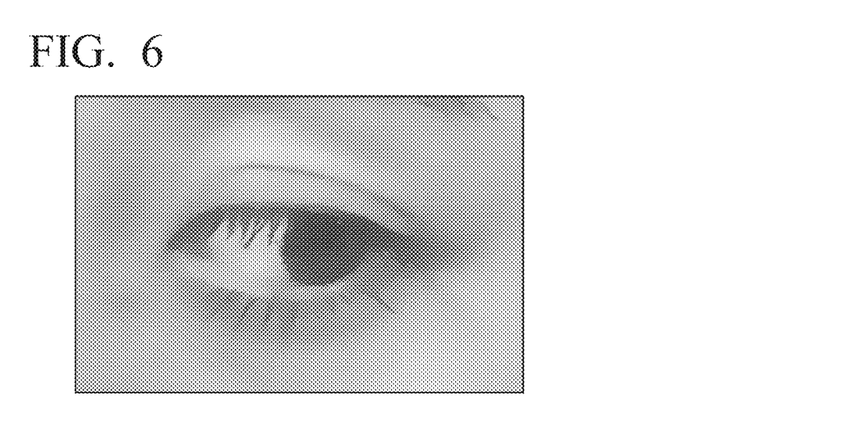
FIG. 6 is a diagram showing a part of a person in which a predetermined event is likely to occur.
Figure 7:
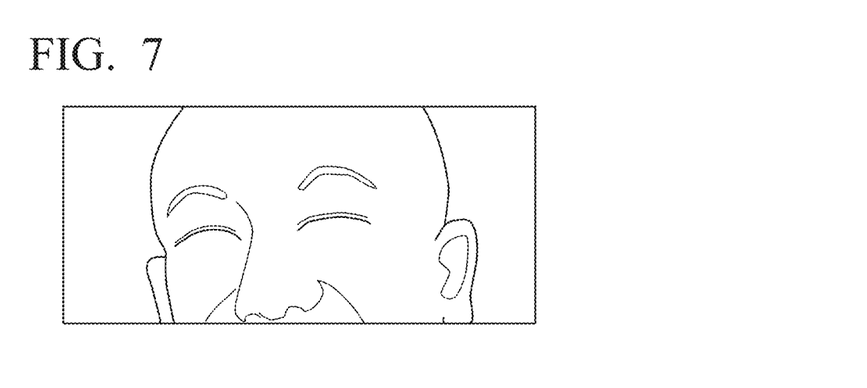
FIG. 7 is a diagram showing a part of a person in which a predetermined event is likely to occur.

FIGS. 5 to 7 are diagrams showing a part of a person in which a predetermined phenomenon is likely to occur. Because the person shown in FIG. 5 has long eyelashes and is prone to downcast eyes, the probability of falling under (1) to (3) is high. Since the person shown in FIG. 6 has long eyelashes, the probability of falling under (1) or (2) is high. Since the person shown in FIG. 7 has very narrow eyes, the probability of falling under (3) or (4) is high. If the coefficients βe and βm, which are the specified values, are used for these persons, since the condition of the eyes cannot be satisfactorily distinguished initially, there is a risk of deterioration of the accuracy of estimating drowsiness. For this reason, the condition estimator 30 changes the ratio of reflecting each of the detection result of the eye detector 24 and the result of the mouth detector 26 in the estimation of condition of the occupant such that the coefficient βe decreases and the coefficient βm increases in the case of handling the aforementioned phenomena. Therefore, the occupant observation device 1 can maintain high accuracy of the occupant condition estimation.

Here, although the condition estimator 30 may switch the coefficients in two stages using a set of coefficients of specific values (initial values) and a set of coefficients in which the coefficient βm increases as the number of corresponding events among the aforementioned (1) to (4) becomes larger, an amount of decrease in the coefficient βe may be increased, or the amount of increase in the coefficient βm may be increased.

Figure 8:
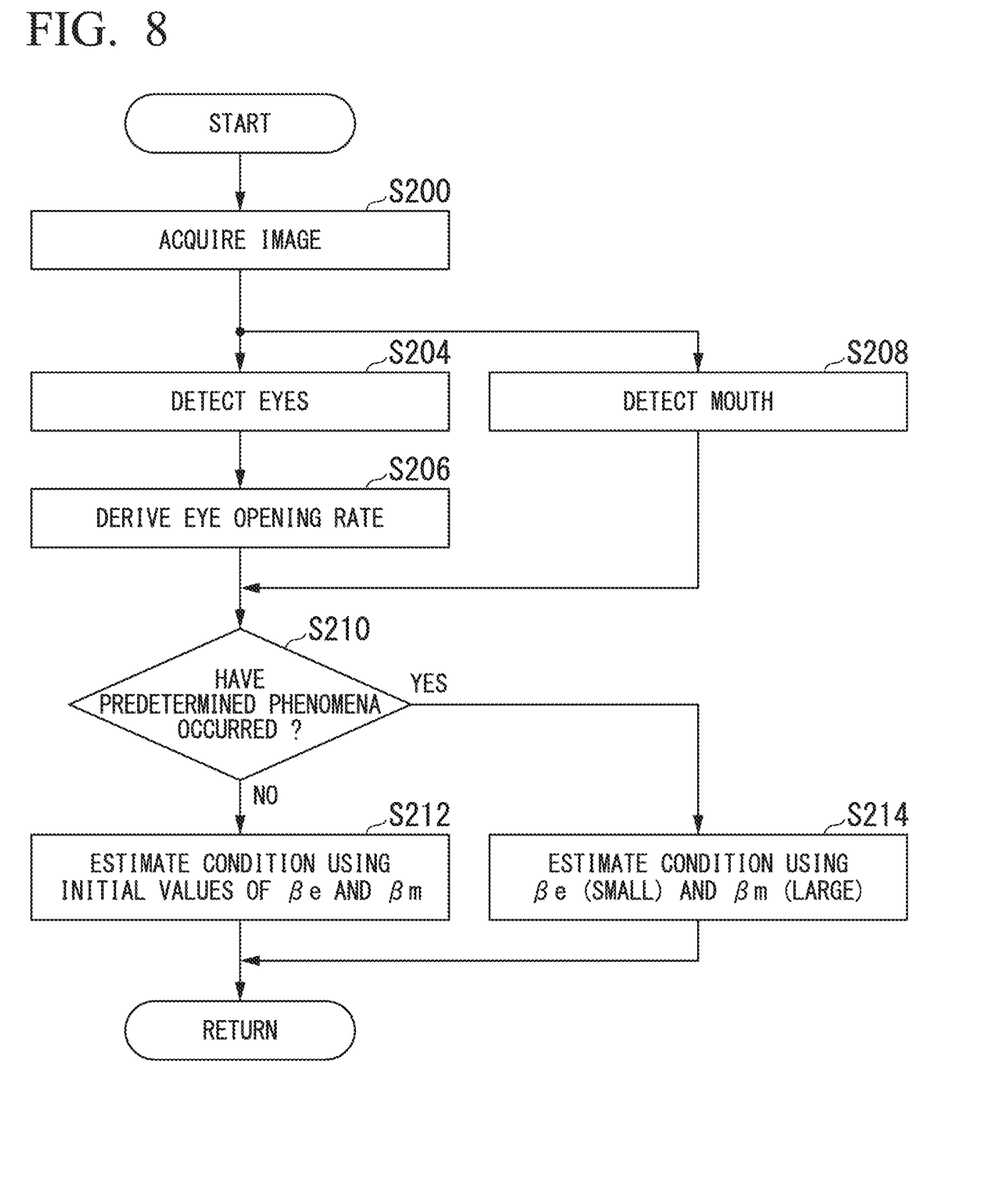
FIG. 8 is a flowchart showing an example of a flow of a process performed by the image processing device.

FIG. 8 is a flowchart showing an example of the flow of a process performed by the image processing device 20. First, the image processing device 20 acquires an image (captured image) captured by the imager 10 (step S200).

Next, the eye detector 24 detects the occupant's eyes (step S204), and the eye opening rate deriving unit 28 derives the eye opening rate (step S206). At the same time, the mouth detector 26 detects the occupant's mouth (step S208).

Further, the condition estimator 30 determines whether the above-described predetermined phenomena have occurred (step S210). When the condition estimator 30 determines that a predetermined event has not occurred, the condition estimator 30 performs condition estimation using the initial values of the coefficients βe and βm, and outputs the results (step S212). On the other hand, when it is determined that a predetermined event has occurred, the condition estimator 30 performs condition estimation using βe changed to a smaller value and βm changed to a large value, and outputs the result (step S214).

According to the occupant observation device 1 of the embodiment described above, since the condition estimator 30 changes the ratio of reflecting each of the detection result of the eye detector 24 and the detection result of the mouth detector 26 in the estimation of the condition of the occupant, on the basis of the detection result of the eye detector 24 or the result of process performed on the basis of the detection result of the eye detector, the accuracy of the condition estimation of the occupant can be maintained at a high level.

According to the occupant observation device 1, when the condition in which the degree Ro of eye opening of the eyes of the occupant is equal to or less than the predetermined degree continues for a predetermined time or more, since the condition estimator 30 changes the ratio of reflecting the detection result of the eye detector 24 and the detection result of the mouth detector 26 in the estimation of the occupant's condition, the accuracy of the estimation condition of the occupant can be maintained high even for an occupant with a narrow eye.

As described above, while the embodiments for carrying out the present invention have been described using the embodiments, the present invention is not limited to such embodiments at all, and various modifications and substitutions may be made without departing from the gist of the present invention.

What is claimed is:

1. An occupant observation device comprising:
an imager configured to capture an image of a head of an occupant of a vehicle; and
a processor configured to:
detect at least a part of eyes of the occupant in the image captured by the imager, based on a distribution of edges extracted from the image, an edge of the distribution of edges being a pixel or a pixel group in which a difference in a pixel value between the pixel or the pixel group and surrounding pixel values of surrounding pixels is greater than a reference value;
detect at least a part of a mouth of the occupant in the image captured by the imager; and
estimate a condition of the occupant based on a result of the eye detection and a result of the mouth detection, and output a result of estimation to an in-vehicle device,
wherein the processor changes a ratio of reflecting the result of the eye detection and a ratio of reflecting the result of the mouth detection based on the estimate of the condition of the occupant,
wherein the processor reduces the ratio of reflecting the result of the eye detection and increases the ratio of reflecting the result to the mouth detection in the estimation of the condition of the occupant, based on the result of the eye detection or a result of a process performed based on the result of the eye detection.

2. The occupant observation device according to claim 1, wherein the processor detects at least a part of a contour of the eyes of the occupant,
derives an eye opening rate of the eyes of the occupant, based on a positional relationship of a plurality of feature points in the detected contour, and
estimates the condition of the occupant based on the eye opening rate of the eyes of the occupant and the result of the mouth detection, and
the result of the process performed based on the result of the eye detection is the eye opening rate of the eyes of the occupant.

3. The occupant observation device according to claim 2, wherein when a condition in which the eye opening rate of the eyes of the occupant is equal to or less than a predetermined degree continues for a predetermined time or more, the processor changes the ratio of reflecting the result of the eye detection and the ratio of the result of the mouth detection in the estimation of the condition of the occupant.

4. The occupant observation device according to claim 2, wherein the condition of the occupant is a drowsiness of the occupant, and
the processor digitizes the drowsiness of the occupant, by calculating a weighted sum of a reciprocal of the eye opening rate and the number of yawns in an observation period.

5. The occupant observation device according to claim 1, wherein the processor reduces the ratio of reflecting the result of the eye detection, when a pupil cannot be distinguished or a white of the eye and an iris cannot be distinguished.

6. The occupant observation device according to claim 1, wherein the processor extracts edges using an edge extraction filter and detects at least a part of the eyes of the occupant in the image on the basis of the distribution of edges, and
reduces the ratio of reflecting the result of the eye detection, when a fitting rate of the edges to the contour of the eye is lower than a reference, or a variation of the distribution of the edges to the fitting curve is larger than a reference.

7. An occupant observation device comprising:
an imager configured to capture an image of a head of an occupant of a vehicle; and
a processor configured to:

detect, as a result of an eye detection, at least a part of eyes of the occupant in an image captured by the imager;

detect, as a result of a mouth detection, at least a part of the mouth of the occupant in the image captured by the imager; and estimate a condition of the occupant based the result of the eye detection and the result of the mouth detection, wherein the processor changes a ratio of reflecting each of the result of the eye detection and the result of the mouth detection in an estimation of the condition of the occupant, based on the result of the eye detection or a result of a process performed based on the result of the eye detection, and wherein the processor reduces the ratio of reflecting the result of the eye detection, when a pupil cannot be distinguished or a white of the eye and an iris cannot be distinguished.

8. An occupant observation device comprising:

an imager configured to capture an image of a head of an occupant of a vehicle; and a processor configured to:

detect, as a result of a eye detection, at least a part of eyes of the occupant in an image captured by the imager;

detect, as a result of a mouth detection, at least a part of the mouth of the occupant in the image captured by the imager; and estimate a condition of the occupant based on the result of the eye detection and the result of the mouth detection, wherein the processor changes a ratio of reflecting each of the result of the eye detection and the result of the mouth detection in an estimation of the condition of the occupant, based on the result of the eye detection or a result of a process performed based on the detection result of the eye detection; and wherein the processor extracts edges using an edge extraction filter and detects at least a part of the eyes of the occupant in the image based on a distribution of edges, and reduces the ratio of reflecting the result of the eye detection, when a fitting rate of the edges to the contour of the eye is lower than a reference, or a variation of the distribution of the edges to the fitting curve is larger than the reference.

* * * * *